United States Patent [19]
Poole

[11] Patent Number: 5,371,815
[45] Date of Patent: Dec. 6, 1994

[54] LOW-LOSS DUAL-MODE OPTICAL FIBER COMPENSATORS

[75] Inventor: Craig D. Poole, Ocean, N.J.

[73] Assignee: AT&T Corp., Murray Hill, N.J.

[21] Appl. No.: 150,513

[22] Filed: Nov. 9, 1993

[51] Int. Cl.[5] .......................... G02B 6/02; G02B 5/14
[52] U.S. Cl. ........................................ 385/28; 385/11;
        385/32; 385/39; 385/123; 385/146; 359/161
[58] Field of Search ..................... 385/12, 13, 11, 27,
        385/28, 29, 30, 31, 32, 39, 123, 146, 147;
        359/109, 156, 161

[56] References Cited

U.S. PATENT DOCUMENTS

| | | | |
|---|---|---|---|
| 4,741,586 | 5/1988 | Kim et al. | 385/28 X |
| 4,895,421 | 1/1990 | Kim et al. | 385/28 X |
| 4,974,931 | 12/1990 | Poole | 385/28 X |
| 5,082,349 | 1/1992 | Cordova-Plaza et al. | 385/28 X |
| 5,185,827 | 2/1993 | Poole | 385/28 |
| 5,208,877 | 5/1993 | Murphy et al. | 385/28 X |
| 5,261,016 | 11/1993 | Poole | 385/28 |
| 5,301,252 | 4/1994 | Yanagawa et al. | 385/28 X |

OTHER PUBLICATIONS

Conference Proceeding European Conf. on Optical Communications "Effect of Bend-Induced Loss in Dual-Mode Fiber Dispersion Compensator" by C. D. Poole & S. C. Wang. Sep. 12, 1993, pp. 453–456.

Primary Examiner—Brian Healy

[57] ABSTRACT

It has been discovered that improved performance and reduced size can be realized in dual-mode fiber dispersion compensators by careful alignment of the mode pattern relative to the plane of the bend of the spooled fiber. In particular, minimum loss occurs when the null line of the $LP_{11}$ mode lies in the plane of the bend. Arrangements for insuring that the fiber assumes the correct orientation for minimum bending loss are disclosed.

9 Claims, 5 Drawing Sheets

HIGH-LOSS BEND

LOW-LOSS BEND

LOW-LOSS DUAL-MODE OPTICAL FIBER COMPENSATORS

TECHNICAL FIELD

The invention relates to optical transmission systems and, in particular, to arrangements for reducing the losses in dispersion compensators used in such systems.

BACKGROUND OF THE INVENTION

When optical waves of different wavelengths propagate along an optical fiber, they do so at different group velocities. This so-called chromatic, or group-velocity dispersion causes pulse broadening which limits the rate at which information can be carried through an optical fiber. Recently, there has been interest in dispersion compensators that use dual-mode fibers operated in the $LP_{11}$ spatial mode, close to their cutoff wavelength. Because higher-order spatial modes in optical fibers exhibit large, negative chromatic dispersion, such an arrangement provides a means for compensating for the positive dispersion in conventional single-mode fiber spans. See, for example, U.S. Pat. No. 5,185,827, issued Feb. 9, 1993, and assigned to applicant's assignee.

The attractiveness of using a dual-mode fiber for dispersion compensation stems from the ability to achieve large negative waveguide dispersion by operating close to the cutoff wavelength of the $LP_{11}$ mode, thereby minimizing the amount of fiber required to compensate a given amount of positive dispersion. However, operation close to cutoff greatly increases sensitivity to bending losses, and it is these losses that place a practical limit on how much dispersion compensation can be realized.

It is, accordingly, the object of the present invention to minimize bending losses in dual-mode fiber dispersion compensators.

SUMMARY OF THE DISCLOSURE

The present invention is based on the discovery that the anti-symmetric $LP_{11}$ mode has the interesting property that the loss induced by a fiber bend depends strongly on the orientation of the spatial mode pattern relative to the plane in which the fiber is bent. In particular, minimum loss occurs when the mode null lies in the plane of the bend. Thus, improved performance and reduced size can be realized in fiber dispersion compensators in accordance with the present invention. Arrangements for insuring that the fibers maintain the correct mode orientation are disclosed.

DETAILED DESCRIPTION

Figure 1:
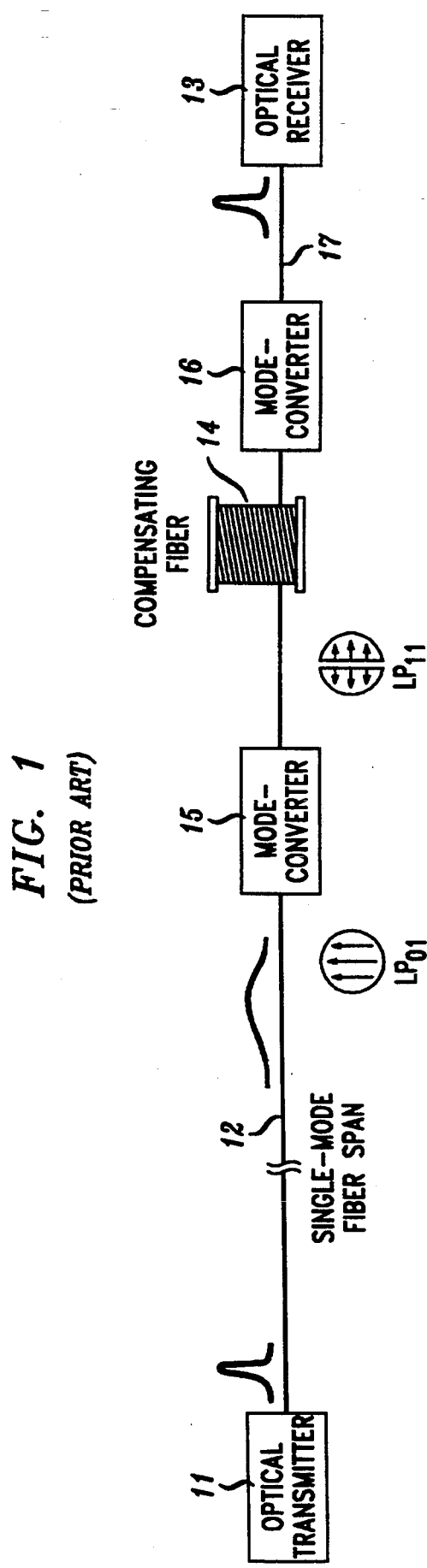
FIG. 1 shows an illustrative optical fiber communication link to which the invention relates.

Referring to the drawings, FIG. 1 shows an illustrative optical fiber communication link to which the invention relates. Typically, the link includes an optical transmitter 11, a single-mode fiber span 12, and an optical receiver 13. In a perfect system, a short pulse applied to the fiber at its input end would be received at the receiver as a correspondingly short pulse. However, because all fibers, both single-mode and multi-mode, introduce dispersion, the pulses broaden as they propagate along the fiber. This broadening reduces the information capacity of the system and, hence, various techniques for reducing wavelength dispersion have been proposed. FIG. 1 illustrates a dispersion compensation technique comprising a compensating fiber 14 designed to guide one or more higher order modes, an input spatial mode converter 15 for converting the $LP_{01}$ spatial mode of the signal propagating along span 12 into the higher order $LP_{11}$ mode, and an output mode converter 16 to reconvert back to the fundamental mode in the output single-mode fiber 17.

In operation, the compensating fiber 14 introduces a negative dispersion, when expressed in the common units of picoseconds per nanometer-kilometer, that compensates for the dispersion introduced in the single-mode fiber span 12. The dominant dispersion introduced by span 12 is material dispersion with some small components of waveguide dispersion. The dominant dispersion introduced by the compensating fiber, on the other hand, is waveguide dispersion. The latter is enhanced in the compensating fiber by designing the fiber to have its cutoff wavelength close to the operating wavelengths. Operating in this manner, more and more of the optical signal extends into the cladding with increasing wavelength. As a consequence, the group velocity increases with increasing wavelength because the cladding material has a lower refractive index than the core. Thus, whereas the material dispersion in span 12 tends to retard the higher wavelengths, the waveguide dispersion in the compensating fiber tends to speed up the higher wavelengths, thus introducing a compensatory effect.

In order for the compensating fiber to be a practical solution to the dispersion effect, it must be capable of producing the desired dispersion in a relatively short length. That means operating as close to cutoff as possible. In addition, the fiber must be capable of being wound onto a spool of relatively small diameter. However, as noted above, operation close to cutoff greatly increases sensitivity to bending losses. This, in turn, places a practical limit on how small the spool diameter can be and on how close to cutoff one can operate.

Figure 2:
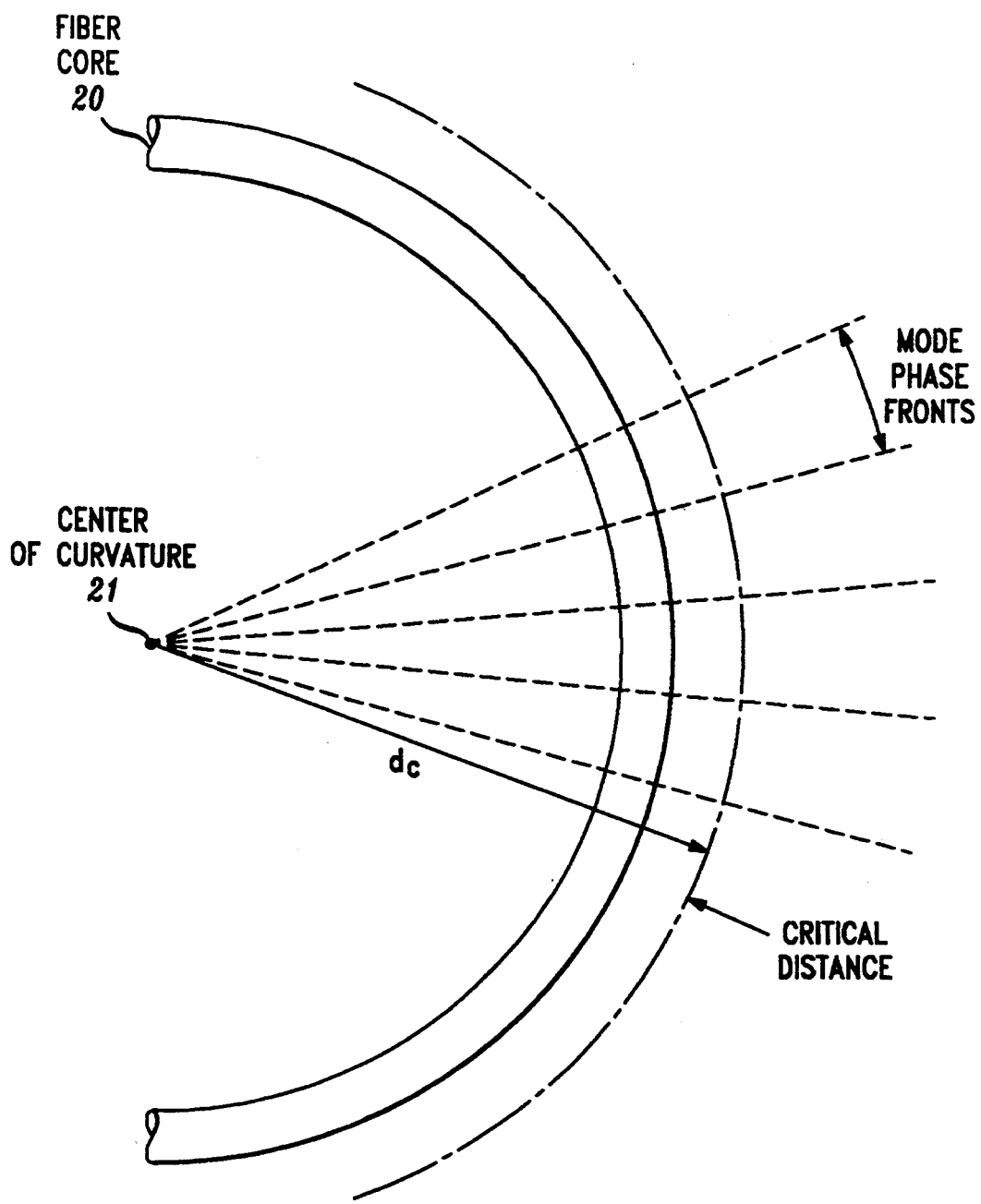
FIG. 2 shows a bent fiber and the critical distance $d_o$.
Figure 3:
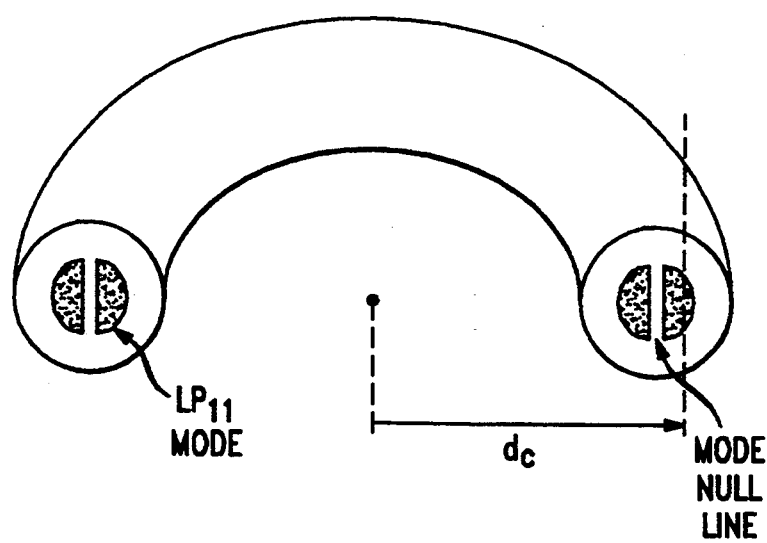
FIGS. 3 and 4 show the effect mode orientation has upon fiber bending loss.
Figure 4:
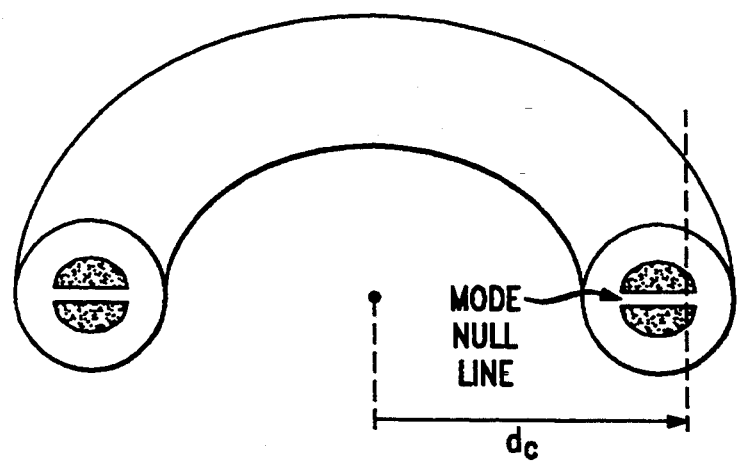

The present invention is based on the discovery that for the $LP_{11}$ mode, the losses introduced by a fiber bend depend strongly upon the relative orientation of the spatial mode pattern relative to the plane of the bend. The reason for this is illustrated in FIGS. 2, 3 and 4.

For any waveguide mode, bending loss occurs when the mode power extends out beyond a critical radius $d_c$. The latter is defined as the radius at which the mode phase front is moving at the speed of light due to the curved trajectory of the mode. This is illustrated in FIG. 2 which shows a bent fiber core 20, and the critical distance $d_c$. It is apparent that the signal energy that extends beyond the core must travel at a faster speed than the signal energy within the core. However, inasmuch as it cannot travel faster than the speed of light, signal energy beyond the critical distance radiates out of the fiber and is lost.

Because the $LP_{11}$ mode is anti-symmetric, the amount of mode power lying beyond $d_c$ depends upon the orientation of the mode null line relative to the plane of the bend. This is illustrated in FIGS. 3 and 4. In particular, FIG. 3 shows a high-loss bend in which the $LP_{11}$ mode null is perpendicular to the plane of the bend. In this case the portion of the signal energy that extends beyond $d_c$ is large. By contrast, in FIG. 4, where the $LP_{11}$ mode is parallel to the plane of the bend, the signal energy that extends beyond $d_c$ is relatively small and, hence, for a given diameter spool, a compensating fiber that is energized such that the mode null is parallel to the plane of the bend will exhibit much less loss than one whose mode null is normal to the plane of the bend. While the difference in loss will depend on many factors, such as spool diameter and operating wavelengths, loss differences as great as 40 db for the two orientations of the null line can be realized.

Figure 5:
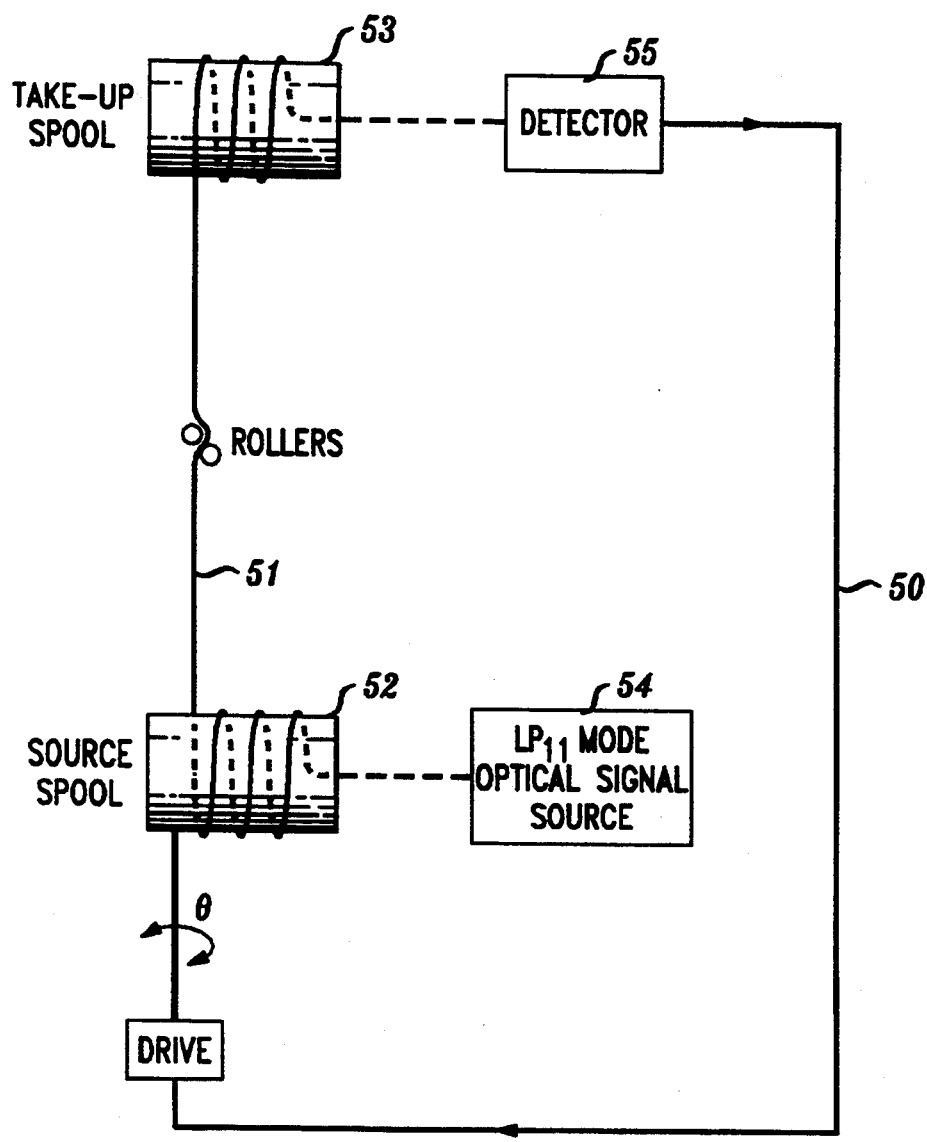
FIG. 5 shows an illustrative arrangement for spooling a dispersion compensating fiber so as to minimize bending losses.

From the above it is apparent that in order to minimize bending losses in the compensating fiber, the latter must be carefully wound onto the compensating fiber spool so as to maintain the proper mode orientation. An example of how a two-mode fiber can be spooled in such a way is illustrated in FIG. 5. In this arrangement a feedback circuit 50 is used to control the angular orientation $\theta$ of the fiber 51 as it is transferred from a source spool 52 onto a take-up spool 53 by measuring the loss of the $LP_{11}$ mode through the fiber as it is spooled. The loss is measured using an $LP_{11}$ mode as the optical source operating close to its cutoff wavelength in conjunction with an appropriate detector 55. The fiber 51 passes between rollers that bend the fiber so as to introduce a measurable loss. A sinusoidal control signal is obtained by varying the angle $\theta$ of the source spool and, hence, the fiber orientation, so that the loss in the fiber fluctuates. The angle $\theta$ is adjusted by means of a feedback circuit so as to minimize the loss through the spooled fiber. That is, by varying the angle $\theta$, the orientation of the mode null relative to the plane of the bend of the spooled fiber is adjusted to minimize bend losses.

Figure 6:
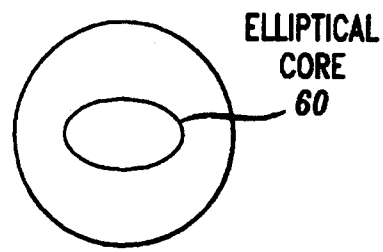
FIG. 6 shows an optical fiber with an elliptical core.

As is evident, an important requirement of any dispersion compensation scheme is that the higher order mode propagate power in the preferred mode over kilometers of fiber without inadvertently coupling power to other modes. Accidental coupling between modes would result in unpredictable modal dispersion effects caused by the differing group velocities of the spurious modes. Possible sources for such coupling would include perturbations in the index profile introduced by microbending or microscopic core-geometry fluctuations introduced in fiber manufacture. An additional consequence of such coupling between modes would be modal noise in the compensating fiber output caused by coherent interference of the modes when power is converted back into the dominant mode for further transmission in the output single-mode fiber. Clearly, what is needed is a fiber configuration that selectively favors the desired mode and the preferred orientation of the mode pattern relative to the plane of the bend. These requirements are met by a fiber that has a slightly elliptical core 60, as illustrated in FIG. 6.

Figure 7:
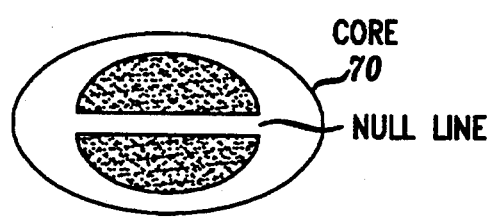
FIGS. 7 and 8 show the mode patterns in an elliptical core fiber.
Figure 8:
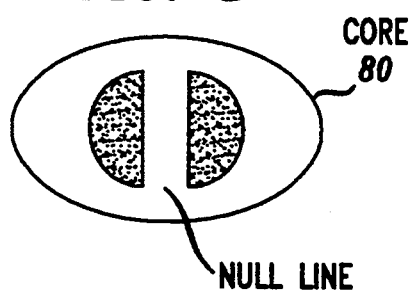

The elliptical core can support both $LP_{11}$ mode patterns, as shown in FIGS. 7 and 8. However, because of the core ellipticity, the two mode patterns have different cutoff wavelengths. In particular, the mode pattern in FIG. 8, wherein the null line is parallel to the minor axis of the core 80, has the higher cutoff wavelength. As an example, in a fiber having a 2% index step and an 8% ellipticity e, where $e=2(a-b)/(a+b)$, a and b being the major and minor core radii respectively, the cutoff wavelengths of the two mode patterns were 1500 nm and 1570 nm. By operating between these wavelengths, only the mode pattern of FIG. 8 is sustained.

In addition to an elliptical core, an elliptical cladding can be advantageously employed to maintain proper mode pattern orientation as the fiber is being spooled.

Figure 9:
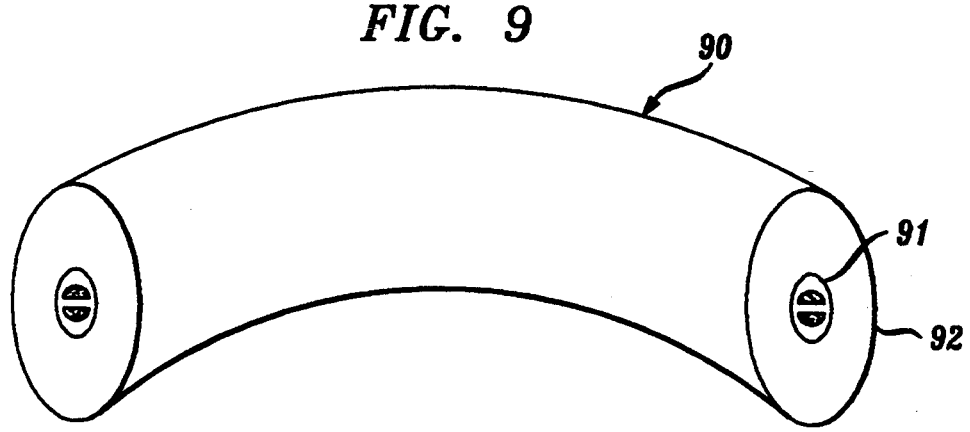
FIG. 9 shows an optical fiber having an elliptical core and an elliptical cladding aligned for minimum bending loss.

FIG. 9 shows a fiber 90 having an elliptical core 91 surrounded by an elliptical cladding 92, where the major and minor axes of the core are parallel to the major and minor axes of the cladding. As such a fiber is spooled, it will tend to align itself such that the minor axes of the cladding and core will lie parallel to the plane of the bend. This, in turn, will align the mode null line parallel to the plane of the bend to form the desired low-loss bend orientation described hereinabove.

Measurements made of bend loss for the $LP_{11}$ mode near cutoff in a dual-mode fiber show that operation within 40 nm of cutoff is feasible in dual-mode fiber dispersion compensators.

While the invention has been described in the context of a dispersion compensator, it should be noted that the invention is more generally applicable to any situation wherein bending losses are to be minimized in a length of optical fiber that must be spooled for any reason. In addition the invention can be practiced employing higher order modes than the $LP_{11}$ mode. So long as the mode lacks circular symmetry, there will be one preferred orientation of the mode pattern relative to the plane of the bend that results in lower bending losses.

What is claimed is:

1. A spooled length of optical fiber;
   and means for energizing said fiber with an optical signal having a single spacial mode including one or more mode null lines that lie in the plane of the bend of said spooled fiber.

2. The arrangement according to claim 1 wherein said fiber has a circular core.

3. The arrangement according to claim 1 wherein said fiber has an elliptical core.

4. The arrangement according to claim 1 wherein said fiber has an elliptical core and an elliptical cladding;
   and wherein the major and minor axes of said core are parallel, respectively, to the major and minor axes of said cladding.

5. The arrangement according to claim 1 wherein said fiber is a dual-mode fiber;
   and wherein said fiber is energized solely in the $LP_{11}$ mode.

6. The arrangement according to claim 1 wherein said spooled length of optical fiber is a dispersion compensator.

7. In an optical transmission system including an optical transmitter and an optical receiver connected by means of a first length of single mode optical fiber, a dispersion compensator disposed along said first length of fiber comprising:
   a spooled length of dual mode optical fiber;
   and a mode converter for converting the mode configuration of any signal propagating along said single mode fiber to an optical signal having a higher order single mode configuration including one or more null lines that lie in the plane of the bend of said spooled length of fiber.

8. The system according to claim 7 wherein the output of said compensator is connected to said receiver.

9. The system according to claim 7 wherein the output of said compensator is connected to a second mode converter for converting said higher order single mode configuration back to the mode configuration of the signal propagation along said single mode fiber.

* * * * *